No. 793,038. Patented June 20, 1905.

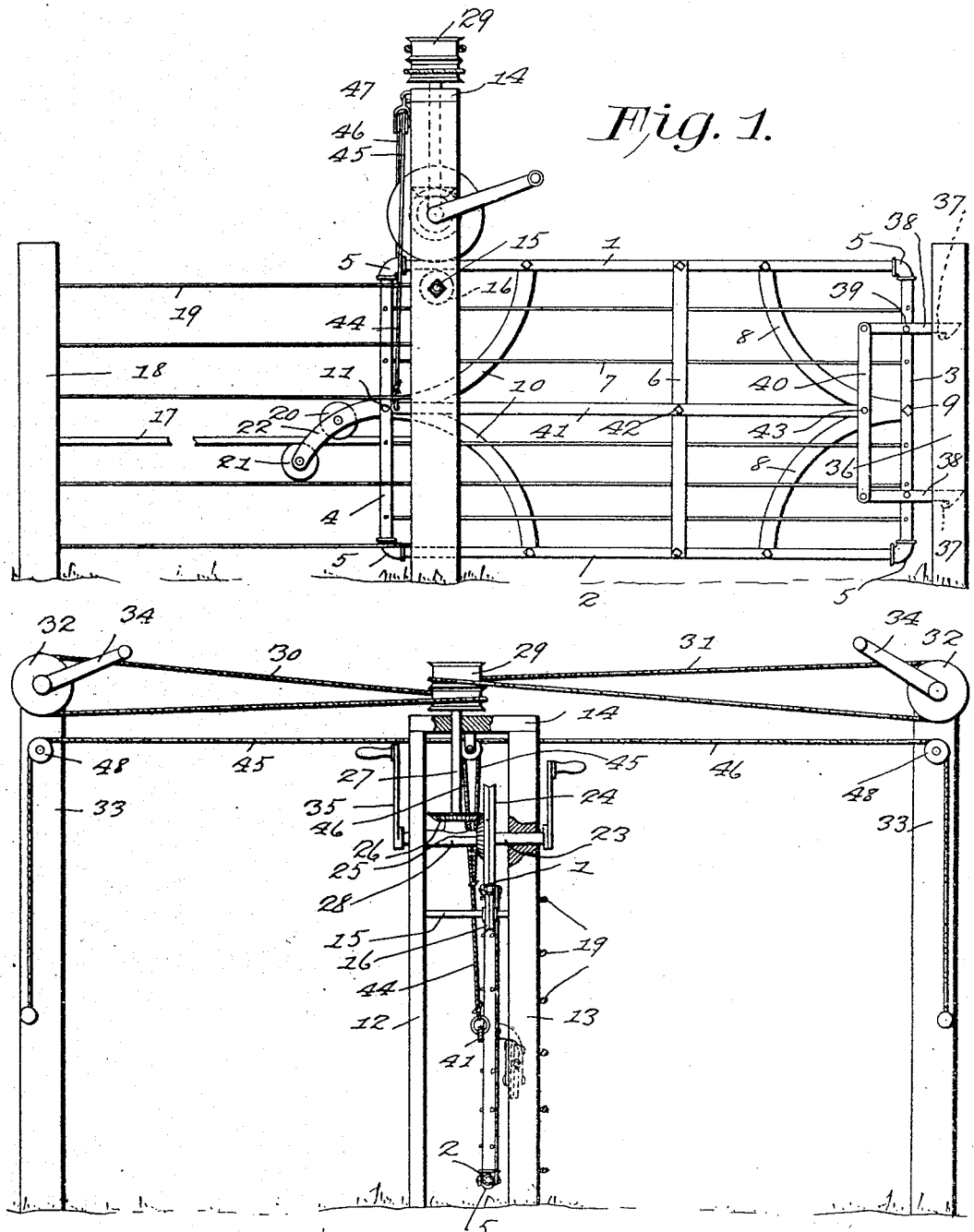

UNITED STATES PATENT OFFICE.

HENRY H. MAY, OF NEW ALBIN, IOWA.

GATE.

SPECIFICATION forming part of Letters Patent No. 793,038, dated June 20, 1905.

Application filed April 13, 1905. Serial No. 255,380.

*To all whom it may concern:*

Be it known that I, HENRY H. MAY, a citizen of the United States, residing at New Albin, in the county of Allamakee and State of Iowa, have invented a new and useful Gate, of which the following is a specification.

This invention relates to sliding gates, and has for its object to provide an improved mounting of the gate, so as to avoid overhead and underfoot tracks across the roadway and at the same time to support the gate in a simple and effective manner, so as to prevent sagging thereof in its closed position.

A further object of the invention is to provide for the convenient opening and closing of the gate without dismounting when riding and also to permit opening and closing of the gate by pedestrians.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a side elevation of a gate mounted in accordance with the features of the present invention Fig. 2 is a cross-sectional view of the gate, showing the operating mechanism therefor, parts of the supporting-frame being broken away to disclose the mounting of the operating mechanism.

Like characters of reference designate corresponding parts in both figures of the drawings.

While the frame of the present gate may be varied considerably in its structure, it is preferred to have the frame made up of piping or tubular sections, including top and bottom longitudinal bars 1 and 2, front and rear end bars 3 and 4, and elbows 5, connecting the pipe-sections at the corners of the gate. There is an intermediate upright cross-bar 6 and longitudinal wires 7 strung across the frame. Forwardly-converged braces 8 extend from the top and bottom bars 1 and 2 and converge forwardly to the front end bar 3, to which they are connected, as indicated at 9. Similar brace-bars 10 converge rearwardly and are connected to the rear end bar 4, as at 11, thereby completing the gate-frame and producing a relatively light and at the same time strong and durable structure.

For the support of the gate there is a gatepost made up of spaced post members 12 and 13, between which the gate slides, said post members being connected at their upper ends by a cross head or bar 14, which is located a suitable distance above the top of the gate. A fixed shaft or bar 15 extends between the post members 12 and 13 and located just below the upper longitudinal 1 of the gate, there being an antifriction-roller 16 loosely mounted upon the bar and engaging the under side of the upper longitudinal bar of the gate, whereby it will be understood that the gate is hung upon the roller 16. Extending rearwardly from the post 13 is a substantially horizontal bar 17, which is supported at its rear end upon a post 18, which is preferably a fence-post, for the support of the fencing 19, which should also be connected to the gate-post 13, so as to close the space between the gate-post and the next adjacent fence-post 18 when the gate is closed. The bar 17 is located below the longitudinal center of the gate and forms a track for upper and lower rollers 20 and 21, carried by a bracket 22, extending rearwardly from the rear gate-bar 4 and preferably a continuation of the converged ends of the brace-bars 10. It will now be understood that the gate is supported upon the roller 16 and also by the rollers 20 and 21, running upon the track 17, which latter is entirely in rear of the gate, wherefore the gate is mounted to slide back and forth without employing an overhead or an underfoot track across the roadway, which is an important advantage of the present invention, in that the roadway is in no wise obstructed by the supporting structure for the gate.

Above the fixed bar or shaft 15 and in vertical alinement therewith there is a rotatable shaft 23, piercing the gate-posts 12 and 13 and provided with a relatively large friction wheel or roller 24, engaging the top of the top bar 1 of the gate-frame. This friction-wheel is provided with a concentric beveled gear 25, meshing with a horizontally-disposed beveled gear 26, carried by an upright shaft 27, which pierces the cross-bar 14 and has its lower end mounted in a bearing-bracket 28, embracing the shaft 23. The upright shaft 27 rises above the cross-bar 14 and is provided with a drum 29, around which pass endless cables 30 and 31, extending, respectively, at opposite sides of the gate and engaging the respective pulleys 32, mounted upon the tops of the individual posts 33 and provided with operating crank-handles 34. By operating either of the cranks 34 one or the other of the cables 30 and 31 will rotate the drum 29, the shaft 27, the gears 26 and 25, and the friction-roller 24, whereby the gate may be slid open or closed, according to the direction of rotation of the pulley 32. The cranks 34 are located at a height to be accessible from a vehicle, and to enable the opening and closing of the gate by pedestrians crank-handles 35 are provided upon opposite ends of the shaft 23.

To latch the gate in its closed position, there is a latch-post 36, provided with upper and lower keepers 37 for engagement by the hooked ends of the upper and lower latches 38, each of which is pivoted intermediate of its ends, as at 39, upon the front end bar 3 of the gate, the rear ends of the latches being connected by an upright bar 40, having its ends pivotally engaged with the latches. A substantially horizontal latch-bar 41 is fulcrumed intermediate of its ends, as at 42, upon the intermediate cross-bar 6 of the gate-frame, with its forward end pivotally connected to the middle of the bar 40, as indicated at 43. A cable 44 rises from the rear end of the latch-bar 40 and has branches 45 and 46, which extend upwardly and then laterally in opposite directions through a double pulley or guide 47, carried by the cross-bar 14 at the top of the gate-posts 12 and 13. The free end portions of the cables 45 and 46 pass around and depend from suitable guides 48, carried upon the posts 33, so as to be in position for pulling downward to elevate the rear end of the latch-bar 41 and depress its forward end, whereby the latches 38 will have their forward free ends tilted vertically out of engagement with the keepers, so as to unlatch the gate and permit opening thereof. The lengths of the free end portions of the cables 45 and 46, which depend below the guides 48, must of course be sufficient to permit of the slidable movements of the gate from one limit to the other without drawing the free ends of the latch-cables entirely through the guides.

Having fully described the invention, what is claimed is—

1. In a gate, the combination with a gate-post, of a slidable gate, a friction-roller carried by the post and engaging the gate, a drum mounted upon the post and operatively connected to the friction-roller, cables wound around the drum and extending in opposite directions therefrom, posts erected at opposite sides of the gate, and crank-operated pulleys carried by the posts and receiving the respective cables.

2. In a gate, the combination with a gate-post, of a slidable gate, a substantially horizontal rotatable shaft carried by the gate-post and provided at opposite ends with crank-handles, a roller carried by the shaft and frictionally engaging the gate to work the latter back and forth, a drum carried by the gate-post and operatively connected to the friction-roller, and operating-cables wound around the drum and extending in opposite directions therefrom.

3. In a gate, the combination with a gate-post, of a slidable gate, a substantially horizontal rotatable shaft carried by the post, crank-handles carried by opposite ends of the shaft, a friction-roller carried by the shaft and engaging the gate to work the latter back and forth, a bearing-bracket carried by the shaft, an upright shaft journaled in the bracket, meshed gears carried by the two shafts, a drum carried by the upright shaft, and controlling-cables wound around the drum and projecting in opposite directions therefrom.

In testimony that I claim the foregoing as my own I have hereto affixed my signature in the presence of two witnesses.

HENRY H. MAY.

Witnesses:
 L. H. GAARDER,
 N. FITSCHEN.